United States Patent
Wagner et al.

(10) Patent No.: US 7,140,684 B2
(45) Date of Patent: Nov. 28, 2006

(54) SEAT, PARTICULARLY A VEHICLE SEAT, PREFERABLY IN AN AEROPLANE

(75) Inventors: Wolfgang Wagner, Friedrichshafen (DE); Jürgen Baumann, Bodman-Ludwigshafen (DE)

(73) Assignee: Recaro Aircraft Seating GmbH & Co.,, Schwäbisch Hall (DE)

( * ) Notice: Subject to any disclaimer, the term of this patent is extended or adjusted under 35 U.S.C. 154(b) by 250 days.

(21) Appl. No.: 10/250,663

(22) PCT Filed: Feb. 6, 2002

(86) PCT No.: PCT/EP02/01190

§ 371 (c)(1),
(2), (4) Date: Jul. 7, 2003

(87) PCT Pub. No.: WO02/066284

PCT Pub. Date: Aug. 29, 2002

(65) Prior Publication Data

US 2004/0066073 A1 Apr. 8, 2004

(30) Foreign Application Priority Data

Feb. 16, 2001 (DE) ................................ 101 07 197

(51) Int. Cl.
*A47C 1/02* (2006.01)
*B60N 2/00* (2006.01)
(52) U.S. Cl. .................................. 297/344.16; 297/329
(58) Field of Classification Search ................ 297/322, 297/325, 329, 337, 344.15, 344.16
See application file for complete search history.

(56) References Cited

U.S. PATENT DOCUMENTS

| 2,682,931 A | 7/1954 | Young |
| 2,784,764 A | 3/1957 | Rigby et al. |
| 2004/0075322 A1 * | 4/2004 | Jaeger et al. ............... 297/325 |

FOREIGN PATENT DOCUMENTS

| DE | 4003776 | 8/1991 |
| DE | 19853981 | 7/1999 |
| DE | 19944620 | 4/2001 |
| FR | 1586051 | 2/1970 |

* cited by examiner

*Primary Examiner*—Milton Nelson, Jr.
(74) *Attorney, Agent, or Firm*—Roylance, Abrams, Berdo & Goodman, L.L.P.

(57) ABSTRACT

A seat includes at least one inclinably adjustable seat component, such as a seat section (12), whose seat frame structure can be disposed on a floor structure (24) in such a way that the seating section is pivotable around its stationary legs (22). The pairs of stationary legs (22) in the region of the front edge (26) and the rear edge (28) of the seating section (12) act upon the seating section. An actuating device (30) adjusts the respective inclination of the seat section (12), and has an exit position, whereby the seat section (12) is orientated in an essentially parallel manner in relation to the floor structure (24) and cannot be inclined. The actuating device (30) extends in the exit position between the stationary legs (22), whereby one end (32) in the region of the front seat (26) is orientated counter to the floor structure (24) and the other end (34) in the region of the rear edge of the seat (28) is orientated in the direction of the seat frame structure (20). As a result, forces arising from a crash are deflected by the actuating device in a safe and targeted manner to the floor structure. The actuating device strives to maintain its original position in the seat frame structure when a crash occurs.

11 Claims, 5 Drawing Sheets

SEAT, PARTICULARLY A VEHICLE SEAT, PREFERABLY IN AN AEROPLANE

FIELD OF THE INVENTION

The present invention relates to a seat, particularly a vehicle seat, preferably for an aeroplane. At least one seat component is adjustable at least in its height, like a seat part, and can be erected with its seat frame structure to be able to swivel on stationary legs on a floor structure. The stationary legs are in pairs in the area of the front seat edge and back seat edge of the seat part, and are engaged in the latter. An actuation means has a multipart movement mechanism with at least one control part for adjusting the respective height for the seat part. In an initial position, the seat part is aligned essentially parallel to the floor structure, with the actuation means extending between the stationary legs such that one actuation means end in the area of the front seat edge points against the floor structure and the other actuation means end in the area of the back seat edge points in the direction of the seat frame structure. At least one stiffening part is dynamically or movably connected to the actuation means by the assigned control part.

BACKGROUND OF THE INVENTION

DE 199 44 620, which was published afterwards, discloses an aircraft passenger seat having individual seat components including a leg rest and a backrest. These seat components can be moved by actuation means in the form of servo-drives or actuators triggered by a hand-operated actuating means for adjusting the seat to the requirements of the seat occupant. For the seat parts, hand levers are modeled to the contours of these seat parts as an element of the actuating means, and are combined with an operating part for adjusting the aircraft passenger seat for adjustment for the respective seat component. To prevent the seat occupant from striking fixed barriers when adjusting the seat components to his requirements, for example, against the rear area of the backrest of a seat following ahead in the lengthwise direction of the seat, the servo-drives have stops against which the respective seat components extend. The pertinent respective stop barrier cannot be passed, even as the pertinent control button continues to be actuated. Another possibility is to turn off the drive by cam-operated limit switches. The pertinent limiting barriers are not always approached without jerking in the known seat designs. This jerking can adversely affect sitting comfort. The respective seat component is also protected by stops in the maximum deflection positions. In case of a crash, this arrangement can lead to the seat frame structure, including the stationary legs, collapsing and accordingly adversely affects the safety of known seat designs.

DE-A-40 03 776 discloses a vehicle seat, especially a motor vehicle seat, with a cushioned support of the seat part adjustable by an adjustment device relative to the freely-swivelling backrest At least in one position of the cushion support above its lowermost position, the cushion support of the seat part is movable back into the initial position by the adjustment device before or at the beginning of freely swivelling the backrest out of its initial position forward and/or at least in the area of its back end section down and after or during swivelling back the backrest into its initial position. Although the known adjustment device can also be used for adjusting the height or tilt of the cushioned support of the seat part, the adjustment possibilities for the individual seat parts are reduced even if in one advantageous configuration of the known design the rocker of the adjustment device is coupled to an adjustment element of variable length which can be, for example, a motor-driven threaded spindle or a working cylinder.

U.S. Pat. No. 2,784,764 discloses a generic seat with two pairs of stationary legs which engage the seat part with a swivelling capacity, and engage the floor mounting device for the seat. Between the stationary legs, an actuator in the form of a roll spindle device extends. One actuator end in the area of the front seat edge points opposite the floor structure. The other actuator end in the area of the rear set edge points in the direction of the seat frame structure. The one free end of the actuator is movably coupled to a control part. The control part is connected to a U-shaped seat rail having a link guide for a rod-like stiffening part. The stiffening part extends transversely to the lengthwise direction of the actuating means in the initial state, and consequently in the raised position of the seat part, extends between the rear stationary legs and the indicated lengthwise link guide. Although the known design is made very stiff, and consequently must be adapted to safety requirements which are higher in a crash. With the known design, it is only possible to adjust the seat part in an incline which has been permanently assigned once to different seat heights, and in this way, to match the requirements of the seat occupant.

SUMMARY OF THE INVENTION

An object of the present invention is to provide improved seats, especially vehicle seats, such as aircraft passenger seats, where the seat, as a complete system, ensures a high level of safety even in case of a crash, and still provides a plurality of adjustment possibilities for the seat, especially relative to the height and tilt adjustment of the actual seat part.

Another object of the present invention is to provide an improved seat movement mechanism which will require only little installation space on the seat and will be economical to implement.

These objects are achieved by a seat with a movement mechanism producing the movable coupling between the respective control part and the assignable stiffening part by at least one coupling part. In the initial position, the respective stiffening part is located essentially parallel to the lengthwise orientation of the actuating means. The forces which occur in a crash are diverted by the actuating means with the respective stiffening part into the floor structure, for example, in the form of a vehicle or aircraft cabin floor in a reliable and dedicated manner. The actuating means keeps the stationary legs apart at least in the initial position in the case of a crash such that the seat frame structure of the overall seat is preserved in any case. Accordingly, the individual seat components are essentially preserved in their structure. In case of a crash, damage is diverted away from the respective seat occupant. Since in case of a crash one of the main loading directions, as a result of the weight of the seat occupant, occurs on the rear seat edge of the seat part, the loading forces which occur there are diverted at an angle of approximately 45° in the raised seat position into the respective vehicle or aircraft cabin floor.

By using another coupling part, the movement and adjustment possibilities for the actuating means in conjunction with the stationary legs and for the respective stiffening part can be enhanced. The seat with its seat part can then be adjusted almost at will, not only in height in the given frame, but at least relative to the seat part. A plurality of tilt adjustments is easily possible by the slaved stationary legs.

This adjustment could not be achieved in the past in this form with the known designs (cf. U.S. Pat. No. 2,784,764).

In one preferred embodiment of the seat of the present invention, the actuating means has an actuator connected on the housing side to the base frame by which the seat can be joined to the floor structure. On the rod side, the actuator has a multipart movement mechanism which interacts with a moving axle extending between the two stationary legs pivotally coupled to the seat frame structure in the area of the transition between the seat part and the backrest. Without limiting possible movements in this way, especially the tilt adjustment possibilities for the seat, a stiff seat frame is clamped and can accommodate the loads which occur in a crash equally in all directions. The moving axle as a tubular stiffening segment, by preference, keeps the two rear stationary legs at a distance. Other tubular stiffening segments extend between the moving axle and the movement mechanism.

In another preferred embodiment of the seat of the present invention, on either side of the actuator housing, two stiffening rods extend. The stiffening rods are made as stiffening parts. One free end of each is hinged to the base frame. On the other free end, each has one coupling point for a pair of assignable stiffening segments. In this way, the actuator itself with its actuating rod or with its drive mechanism is relieved. Preferably, the control part, with its one end, is fixed in an articulated manner in the area of the free end of the actuating rod to the latter. Its other end has a coupling point for an assignable stiffening rod.

In one especially preferred embodiment of the seat of the present invention, a contact point is between the control part and the coupling part in the direction of the free end of the actuating rod outside of the imaginary connecting line between the moving axle and the coupling point of the actuator housing on the base frame. In this locked position, crash forces directed possibly along the imaginary connecting line as a result of this "overcentering" can lead to the contact point being moved in the direction of the control part as a reliable abutment. Yielding and collapsing of the seat in case of a crash as a result of binding forces of the movement mechanism therefore are for the most part precluded.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
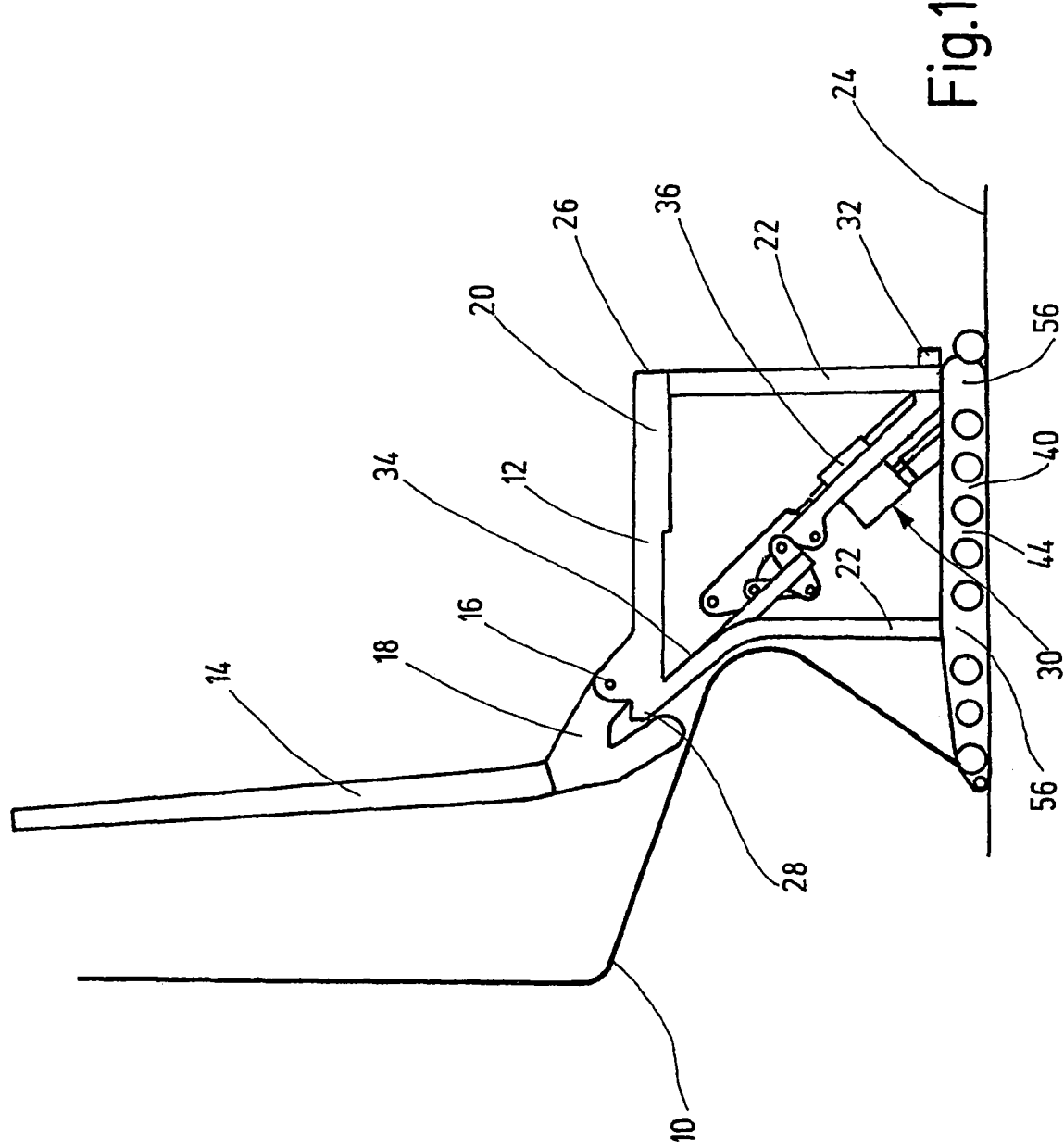
FIG. 1 is a schematic side elevational view of an aircraft passenger seat without the leg rest and without the cushion parts, according to an embodiment of the present invention.

FIG. 1 shows an aircraft passenger seat in the upright position. Such aircraft passenger seats with the corresponding level of outfitting are often found in the first class compartment of long-range aircraft. They could also be used in luxury tour busses or in passenger ships including ferries. Furthermore, the seat can be used as a medical treatment chair for surgery or dentistry. Other applications are in sports medicine and as a chair for the application of cosmetics.

The illustrated aircraft passenger seat, as shown in FIG. 1, is preferably a component of a compartment which is shown by suggestion in FIG. 1. The aircraft passenger seats could also be used in arrangements next to one another in a row in business class for a conventional multiseat arrangement or the like.

The aircraft passenger seat comprises individual seat components, such as a seat part 12, a backrest 14 and a leg rest system which is not detailed. For greater clarity, the cushion supports for the indicated seat components are omitted in FIG. 1 so that the underlying frame parts are visible. The backrest 14 is positioned to be able to swivel around an articulation point 16 by an actuation mechanism, which is not detailed, in its incline relative to the seat part 12 extending essentially horizontally in the initial position. The frame of the backrest 14, on its lower end, leads into a forked end piece 18. One fork end interacts with the actuation mechanism which is not detailed. The other fork end engages the articulation point 16.

The seat part 12 is provided with a seat frame structure 20 which can be vertically mounted with a swivelling capacity on a floor structure 24 by four stationary legs 22. The pertinent floor structure 24 is formed, for example, by the aircraft cabin floor. The stationary legs 22 adjoin in pairs in the area of the front seat edge 26 and the rear seat edge 28 of the seat part 12. An actuating means, designated as a whole as 30, is provided for adjusting the respective tilt for the seat part 12. In the initial position as shown in FIG. 1, the seat part 12 is aligned essentially parallel to the floor structure 24, and consequently does not have any tilt in this horizontal alignment.

Figure 2:
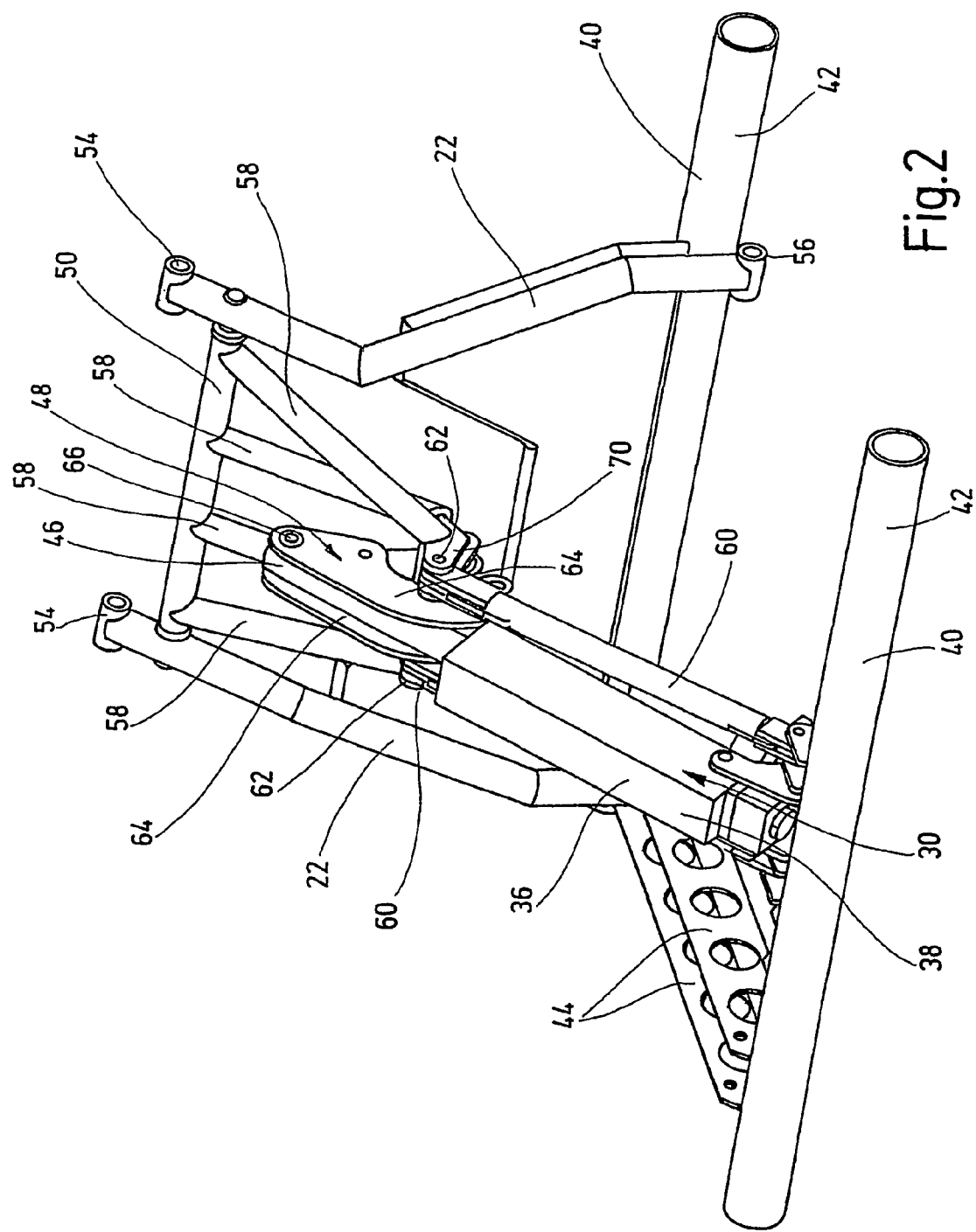
FIG. 2 is a schematic perspective view of part of the movement mechanism of the aircraft passenger seat shown in FIG. 1, swivelled by 180° around the vertical axis.
Figure 3:
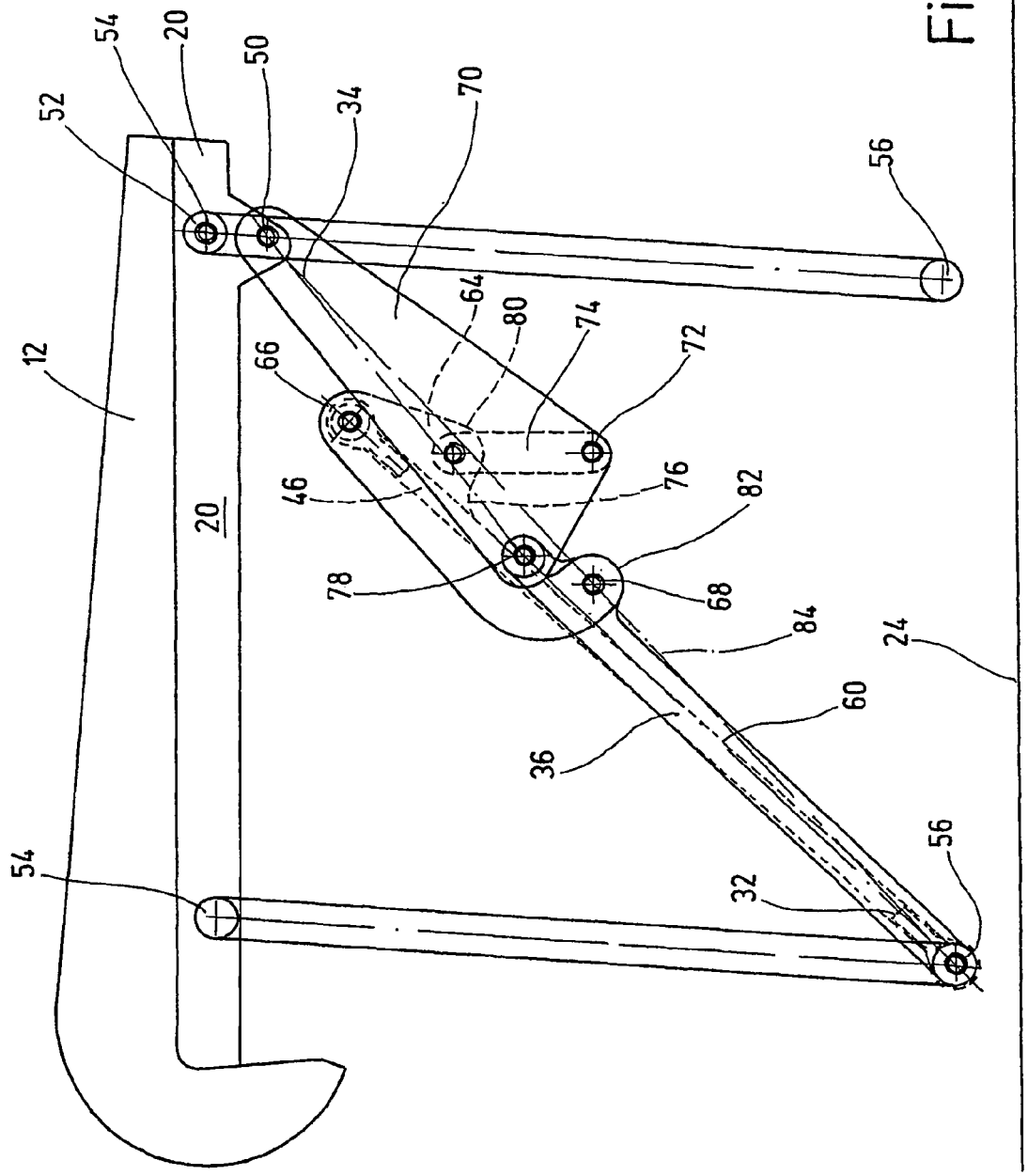
FIG. 3 is a schematic side elevational view of part of the movement mechanism shown in FIG. 2 acting on the seat part and moving the seat part out of the initial position.

In the initial position of the seat part 12 shown in FIGS. 1 to 3, the actuating means 30, with its essential components, extends between the front and rear pairs of stationary legs 22. One end 32 of the actuating means 30 in the area of the front seat edge 26 points against the floor structure 24. The other end 34 of the actuating means 30 in the area of the rear seat edge 28 points in the direction of the seat frame structure 20. In this way, secure clamping of the seat frame base structure 20 with the four stationary legs 22 is achieved. Furthermore, the actuating means 30 extends in the manner of a clamping rod within the seat structure. In the initial position of the seat with the horizontally aligned seat part 12 and the raised seat back 14, the loading forces which may occur pulsed in a crash are diverted by the actuating means 30 into the floor structure 24. The forces occurring, especially on the rear seat edge 28, as a result of the force of the weight of the seat occupant in this inclined position are directed by the front area of the seat into the floor structure 24 by the pertinent braced arrangement. The actuating means extends between the stationary legs 22 essentially at an angle of 45° to the floor structure 24. The tilted arrangement of the actuating means 30 therefore yields an effective holding counterforce which keeps the seat in its initial position and especially provides for neither the seat frame structure 20 nor the other structural components being twisted into themselves. This twisting could possibly increase the danger of injury to the seat occupant.

As FIG. 2 shows in particular, the actuating means 30 has an actuator 36 pivotally connected by its housing 38 to the base frame 40. The seat as whole can be connected to the floor structure 24 of the aircraft by the base frame 40. For the sake of simplicity, FIG. 2 shows only the two base frame tubes 42 of the base frame 40 and the two rear floor rails 44 which along the seat adjoin the two free ends of the respective base frame tube 42. The actuator 36 can be a hydraulically or pneumatically actuated working cylinder, optionally of a spindle drive or the like. In the illustrated embodiment, actuator 36 has an electric motor for extending the actuating rod 46 of the actuator 36 from and retracting it into its housing 38. The configurations of the pertinent actuators are prior art, and will not be further detailed here.

On the free end of the actuating rod 46, the actuating means 30 has a multipart movement mechanism which is designated as a whole as 48. The movement mechanism 48 interacts with its moving axle 50 extending between the pair of rear stationary legs 22 in the area of the rear seat edge 28 of the aircraft passenger seat as shown in FIG. 1. For better representation, in FIG. 2 the front pair of stationary legs 22 is omitted. As FIG. 3 shows in particular, the moving axle 50 extends underneath the seat frame structure 20 and underneath the respective coupling point 52 by which the respective top ends 54 of the stationary legs 22 are pivotally coupled to the seat frame structure 20. The lower ends 56 of the respective stationary legs 22 are in turn pivotally coupled to the floor rails 44 extending in pairs in the lengthwise direction.

As FIG. 2 shows, the moving axle 50, made as a tubular stiffening segment, holds the two rear stationary legs 22 at a distance from one another. Four other tubular stiffening segments 58 extend between this moving axis 50 and the movement mechanism 48. The tubular moving axle 50, viewed in the direction of FIG. 2, consequently is braced towards the bottom. The crash forces delivered in this area are reliably diverted into the base frame 40 and consequently into the floor structure 24 by the actuating means 30. To further brace the seat frame, to the left and right two stiffening rods 60, as stiffening parts, are provided. Each stiffening rod has one free end hinged to the base frame 40 and another free end with a coupling point 62 for a pair of assignable stiffening segments 58. The stiffening segments 58 ensure that the moving axle, which is made as a tubular stiffening segment, cannot deform undesirably in case of a crash, and consequently, in any case ensures that the rear pair of stationary legs 22 is held apart.

Figure 4:
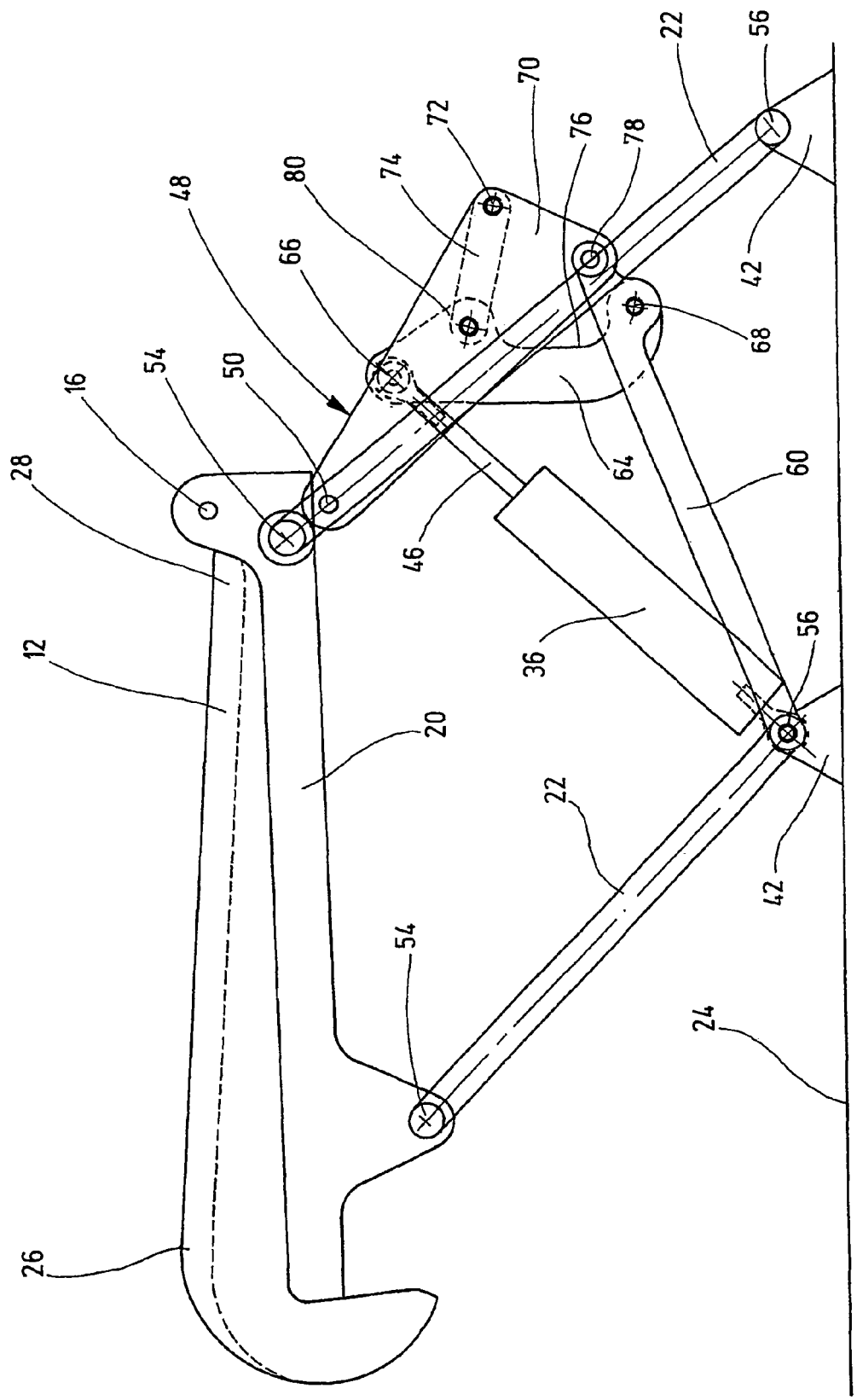
FIG. 4 is a schematic side elevational view of the movement mechanism shown in FIG. 2 after being moved into a comfortable position.
Figure 5:
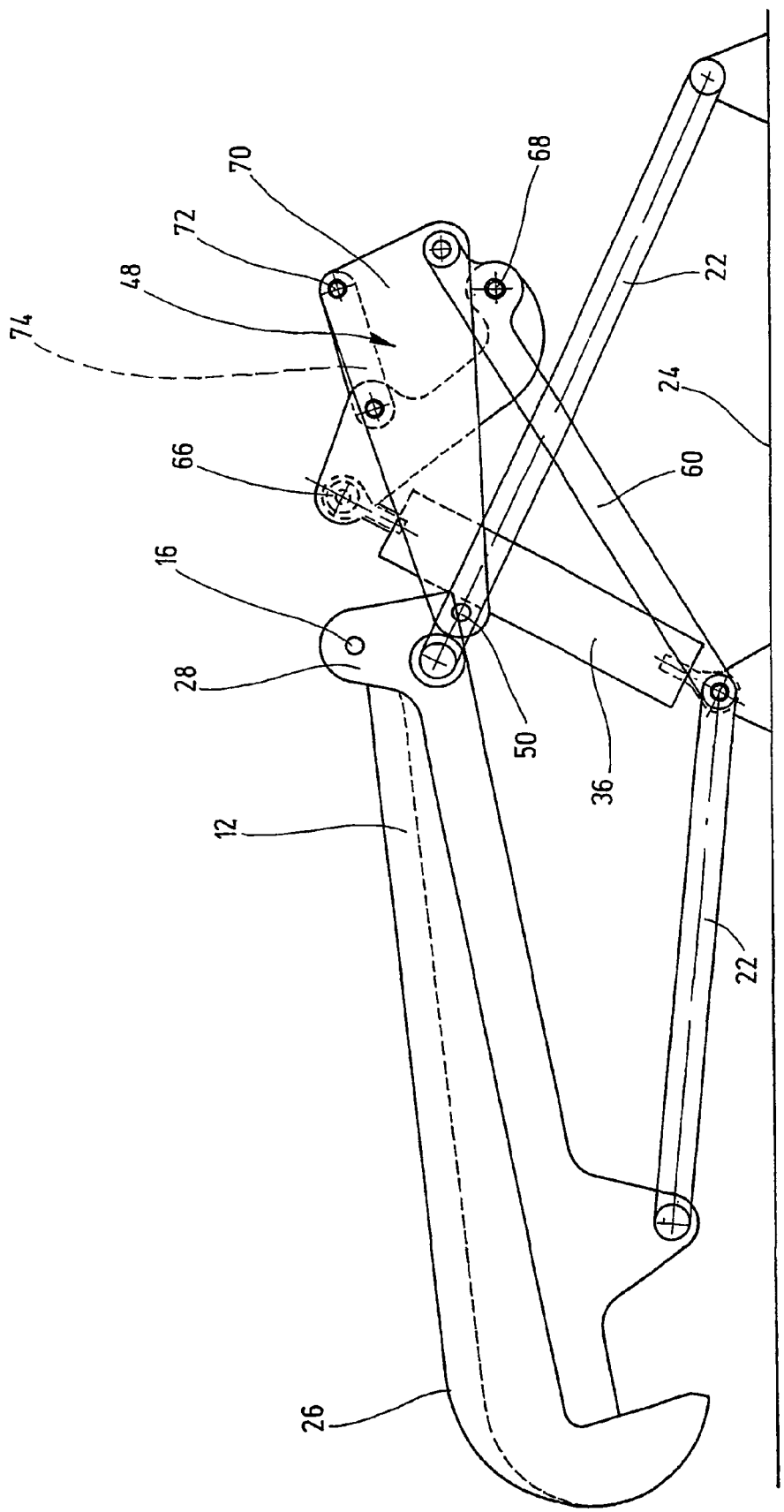
FIG. 5 is a schematic side elevational view of the movement mechanism shown in FIG. 2 after being moved into a fully reclined position.

In order to better illustrate the operation of the movement mechanism, this movement mechanism is modeled in FIGS. 3, 4 and 5. The operation shown also takes place with respect to the practical embodiment as shown in FIG. 2.

The movement mechanism 48 on either side of the actuation means has a hook-like control part 64. One control part end 66, in the area of the free end of the actuating rod 46, is coupled to the rod 46. The control part other end 68 has a coupling point for the respective stiffening rod 60. The movement mechanism 48, by coupling parts 70 located on both sides of the actuator 36, establishes the movable coupling between the moving axle 50, the respective control part 64 and the respective stiffening rod 60. In the practical version, the coupling part 70 is made in the manner of an angled bridge, but in the theoretical model form shown in FIG. 3 ff., it is made as a triangular joining plate.

As FIGS. 3 to 5 show, the respective triangular coupling part 70, on one of its triangular ends, is pivotally coupled to the moving axle 50. On its other opposing triangular end, coupling part 70 is pivotally joined to the respective stiffening rod 60. Coupling part 70 is pivotally coupled to the control part 64 by its triangle apex 72 and a rod-like coupling element 74. The respective control part 64 is provided with a control edge 76. In the initial position of the seat shown in FIG. 3, control edge 76 is in contact with the coupling point 78 of the respective stiffening rod 60 on the coupling part 70. The rod-like coupling element 74 is consequently pivotally coupled at its free end to the triangle apex 72 of the coupling part 70 and at its other free end to the connecting hump 80 of the control part 64. The control edge 76 of the control part 64 consequently extends between the connecting hump 80 and the hook-like end 82 of the control part 64, with the other end 68 being coupled to one of the two stiffening rods 60.

As shown in FIG. 3, a coupling point in the form of the contact point 78 is between the control part 64 and the coupling part 70 in the direction of the free end of the actuating rod 46 outside an imaginary connecting line 84 between the moving axle 50 and the coupling point 56 of the actuator housing 38 on the base frame 40. Consequently, the contact point 78 bears against the control edge 76 of the control part 64 as an abutment. The pertinent pivot is "overcentered" in the direction of the seat frame structure 20. When a force is applied in case of a crash in the direction of the imaginary connecting line 84, in the manner of a toggle lever, the contact point 78 is then overstretched, with the result that an effective abutment is formed by this off-center coupling. Consequently, the forces of the abutment increase as soon as the forces along the imaginary connecting line 84 increase accordingly.

In the fully extended position of the actuator 36 the seat part 12, the seat frame 20 is aligned essentially horizontally. If at this point, the actuating rod 46 is retracted in the direction of the actuator housing 38, for a comfortable position shown in FIG. 4. In this comfortable position, the rear seat edge 28 is located lower in the vertical direction compared to the reference plane of the front seat edge 26. Also, in the comfortable position, the thigh area of the seat occupant is consequently supported correspondingly high, producing a comfortable sitting position. As shown in FIG. 4, the pairs of stationary legs 22 are swivelled forward counterclockwise. Both the control part 64 and the coupling part 70 also have a swivelling motion clockwise to pass through around the coupling point 66 and around the moving axle 50. Additional bracing takes place by the rod-like coupling element 74. If the actuating rod 46 is retracted farther in the direction of the actuator housing 38, a type of bed or fully reclined position as shown in FIG. 5 results, with the stationary legs 22 being tilted still farther forward counterclockwise around their lower pivots. At this point the front seat edge 26 is tilted down relative to the rear seat edge 28, it being possible for the seat part cushion of the backrest 14 (not shown), the seat part 12 and the leg rest which is not detailed to form an obliquely tilted support or resting surface. In the pertinent fully reclined position, both the coupling part 70 and the coupling element 74 with the triangle apex 72 are moved up in the vertical direction by the moving axle 50. Also, one end 66 of the control part 64 is located essentially in the horizontal plane of the articulation point 16. Consequently, it is possible to trigger the most varied sitting positions by a control (not shown) with only one actuating means 30. In the upright seat position shown in FIG. 3, only one potential crash case is assumed.

The actuating means 30 with the movement mechanism 48 requires only little installation space and saves weight.

The movement mechanism 48 ensures that an adjustment possibility for the seat part 12 is achieved with only a small path of travel of the actuator 36 in a widely drawn frame.

While one embodiment has been chosen to illustrate the invention, it will be understood by those skilled in the art that various changes and modifications can be made therein without departing from the scope of the invention as defined in the appended claims.

What is claimed is:

1. A seat mounted above a floor structure, comprising:
   a seat part adjustable in height and having a front seat edge and a rear seat edge, said seat part having an initial position essentially parallel to the floor structure;
   a seat frame coupled to and supporting said seat part, said seat frame having front and rear pairs of stationary legs adjacent said front seat edge and said rear seat edge, respectively, and engaged with said seat part;
   an actuator with first and second ends and a lengthwise orientation, said actuator extending between said stationary legs in the initial position with said first end in an area of said front seat edge pointing towards the floor structure and with said second end in an area of said back seat edge pointing toward said seat frame; and
   a movement mechanism coupled to said actuator, said movement mechanism including at least one control part to adjust heights of said seat part having at least one stiffening part movably coupled to said actuator by said control part, and including at least one coupling part movably coupling said control part and said stiffening part, said stiffening part being essentially parallel to said lengthwise orientation of said actuator.

2. A seat according to claim 1 wherein
the seat is a vehicle seat.

3. A seat according to claim 1 wherein
the seat is an airplane seat.

4. A seat according to claim 1 wherein
said actuator has an actuator housing connected to a base frame of said seat frame joining said seat frame to the floor structure, and has an actuator rod connected to said movement mechanism;
a moving axle extends between two said stationary legs pivotally coupled to said seat frame in a transition area between said seat part and a backrest coupled thereto.

5. A seat according to claim 4 wherein
said actuator rod is fully extended from said actuator housing in the initial position of said seat part;
said actuator rod is partially retracted in said actuator housing when the seat part is in a comfortable position with said front seat edge tilted higher than said rear seat edge; and
said actuator rod is fully retracted in said actuator housing when the seat part is in a fully reclined position with said front seat edge lower relative to said rear seat edge.

6. A seat according to claim 4 wherein
said moving axle forms a tubular stiffening segment keeping said rear pair of stationary legs spaced apart; and
other tubular stiffening segments extend between said moving axle and said movement mechanism.

7. A seat according to claim 6 wherein
said moving axle, toward the floor structure, is located beneath connecting points pivotally coupling said seat part to said rear pair of stationary legs.

8. A seat according to claim 6 wherein
two stiffening rods extend on sides of said actuator housing and are made as stiffening parts with first free ends thereof hinged to said base frame and with second ends thereof having a coupling point connected to the respective tubular stiffening segments.

9. A seat according to claim 8 wherein
said control part has one end articulated to a free end of said actuator rod and another end with a coupling point connected to the respective stiffening rod.

10. A seat according to claim 9 wherein
said control part has a control edge in contact with a coupling point of the respective stiffening rod on a coupling part, in the initial position of the seat.

11. A seat according to claim 10 wherein
a contact point between said control part and said coupling part, in a direction of said free end of said actuator rod, is outside of an imaginary connecting line between said movable axle and a coupling point of said actuator housing on said base frame.

* * * * *